United States Patent [19]
Chung

[11] Patent Number: 5,652,552
[45] Date of Patent: Jul. 29, 1997

[54] PHASE MODULATOR

[75] Inventor: Chan Hyung Chung, Kyoungkido, Rep. of Korea

[73] Assignee: Hyundai Electronics Industries Co., Ltd., Rep. of Korea

[21] Appl. No.: 619,965

[22] Filed: Mar. 20, 1996

[30] Foreign Application Priority Data

Mar. 20, 1995 [KR] Rep. of Korea .................... 1995-5760

[51] Int. Cl.⁶ .................... H03C 3/00; H04L 27/20
[52] U.S. Cl. .................... 332/104; 375/308
[58] Field of Search .................... 332/103, 104, 332/105; 375/279–284, 308

[56] References Cited

U.S. PATENT DOCUMENTS

| | | | |
|---|---|---|---|
| 3,100,890 | 8/1963 | Henning | 332/104 X |
| 3,412,206 | 11/1968 | Bizet et al. | 332/104 X |
| 4,584,693 | 4/1986 | Levy et al. | 332/104 X |

*Primary Examiner*—David Mis
*Attorney, Agent, or Firm*—Blakely Sokoloff Taylor & Zafman

[57] ABSTRACT

A phase modulator that generates four different kinds of phases according to input data, using a counter and an adder. There is provided a phase modulator with a serial-to-parallel data converter for converting serial data into two parallel data which are reduced by half of the clock velocity; and a digital phase signal generator for generating digital signals having a phase difference, using a counter and an adder. In this manner, the digital signals have digital values similar to sine waves having a phase difference.

9 Claims, 8 Drawing Sheets

FIG. 1
(PRIOR ART)
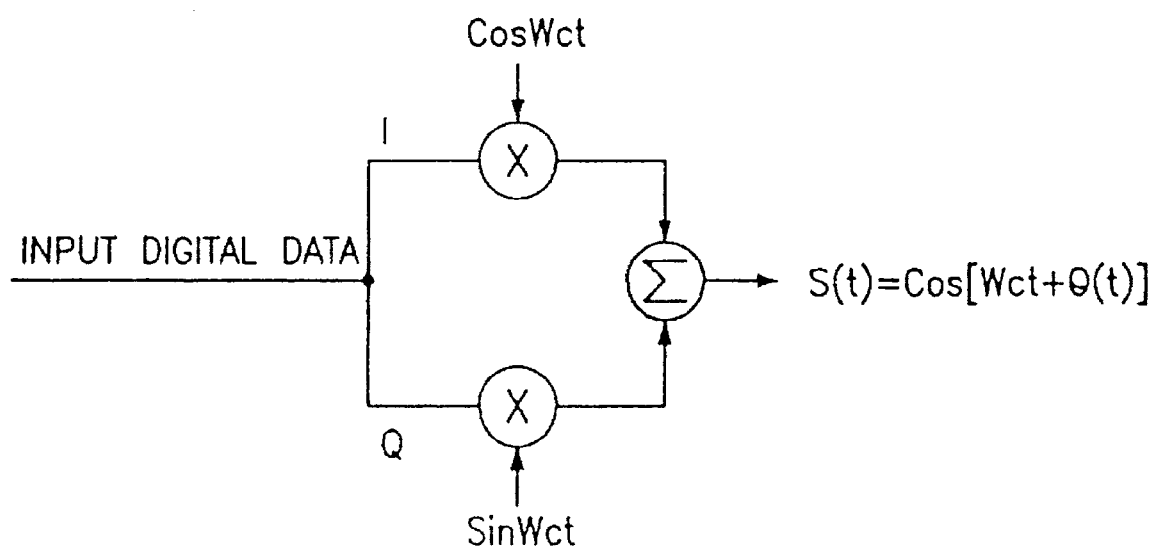
FIG. 1A
FIG. 1B
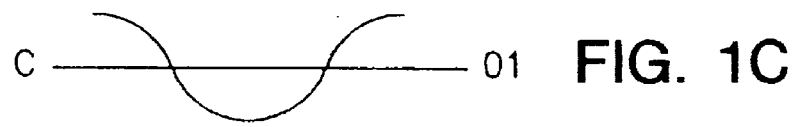
FIG. 1C
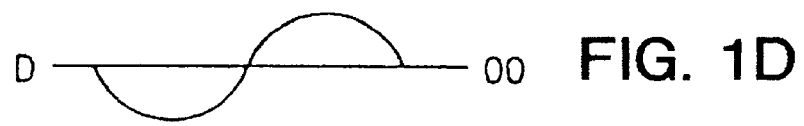
FIG. 1D

PHASE MODULATOR

BACKGROUND OF THE INVENTION

1. Field of the Invention

The present invention relates to a quadrature phase modulator which generates quadrature phase modulating signals in digital type using a counter and an adder.

2. Description of the Prior Art

In general, with the advent of a satellite broadcasting and a mobile communication, it has become very important to transmit and receive data between a transmitter and a receiver. In order to transmit and receive data between a transmission terminal and a receiving terminal, data which are modulated in the transmission terminal are transmitted to the receiving terminal using wire or radio channels. Since this digital communication method is not nearly influenced by external noises, it is widely used to clearly reconstruct the transmitted signals on the receiving side. In methods for modulating the digital signals, there are ASK(Amplitude Shift Keying), PSK(Phase Shift Keying) and FSK (Frequency Shift Keying).

PSK, which is a technique that modulates the phase according to the phase shift corresponding to the digital data, is commonly used in radio communication, such as a satellite capable of transmitting signals in low power.

The quadrature phase modulation is commonly used in satellite broadcasting because it can transmit data by two bits in only a form of sine wave, and then decrease the bandwidth of the transmission channel.

FIG. 1 is a view illustrating the principle of a conventional quadrature phase modulator. Four types of sine wave forms are generated according to input digital data. In FIG. 1, wave form A, B, C and D, which are respectively shifted out of phase by 90 degrees, denote input digital data 11, 10, 01 and 00, respectively. That is to say, the quadrature phase modulation manner generates one sine wave form by 2 bits corresponding to the input digital data multiplied by the carrier frequency (sin Wct, cos Wct).

FIG. 2 is a view showing a conventional quadrature phase modulator which consists of a serial-to-parallel data converter, a delay device, a low pass filter, an oscillator, amplifiers, multipliers, an adder, a band pass filter, an oscillator, amplifiers, multipliers, an adder, a band pass filter and a phase shifter. In FIG. 2, the serial-to-parallel data converter converts serial input digital data into parallel data I_OUT and Q_OUT. Data I_OUT and Q_OUT, which pass through the low pass filter and the amplifier, are respectively converted into sine wave forms. Two signals having a phase difference of 90 degrees are generated by the oscillator, and each signal is multiplied by the output of the amplifier. Data I_OUT and Q_OUT passing through the amplifier are added up at the adder and pass the band pass filter and are transmitted to a channel through the amplifier.

However, the conventional quadrature phase modulator has problems in that the chip increases in size because of the use of the low pass filter, the band pass filter and the oscillator, and the adder decreases slows down it.

SUMMARY OF THE INVENTION

An object of the invention is to provide a phase modulator that generates four different kinds of phase according to input data, using a counter and an adder.

In accordance with an aspect of the present invention, there is provided a phase modulator comprising: a serial-to-parallel data converting means for converting serial data into two parallel data which reduced by half of the clock velocity; and a digital phase signal generating means for generating digital signals having phase difference, using a counter and an adder, wherein said digital signals has digital values similar to sine waves having a phase difference.

BRIEF DESCRIPTION OF THE DRAWINGS

Other objects and aspects of the invention will become apparent from the following description of embodiments with reference to the accompanying drawings, in which:

FIG. 1 is a view illustrating the principle of a conventional quadrature phase modulator.

DETAILED DESCRIPTION OF THE INVENTION

Hereinafter, the present invention will be described below referring to FIGS. 3 to 8.

Figure 2:
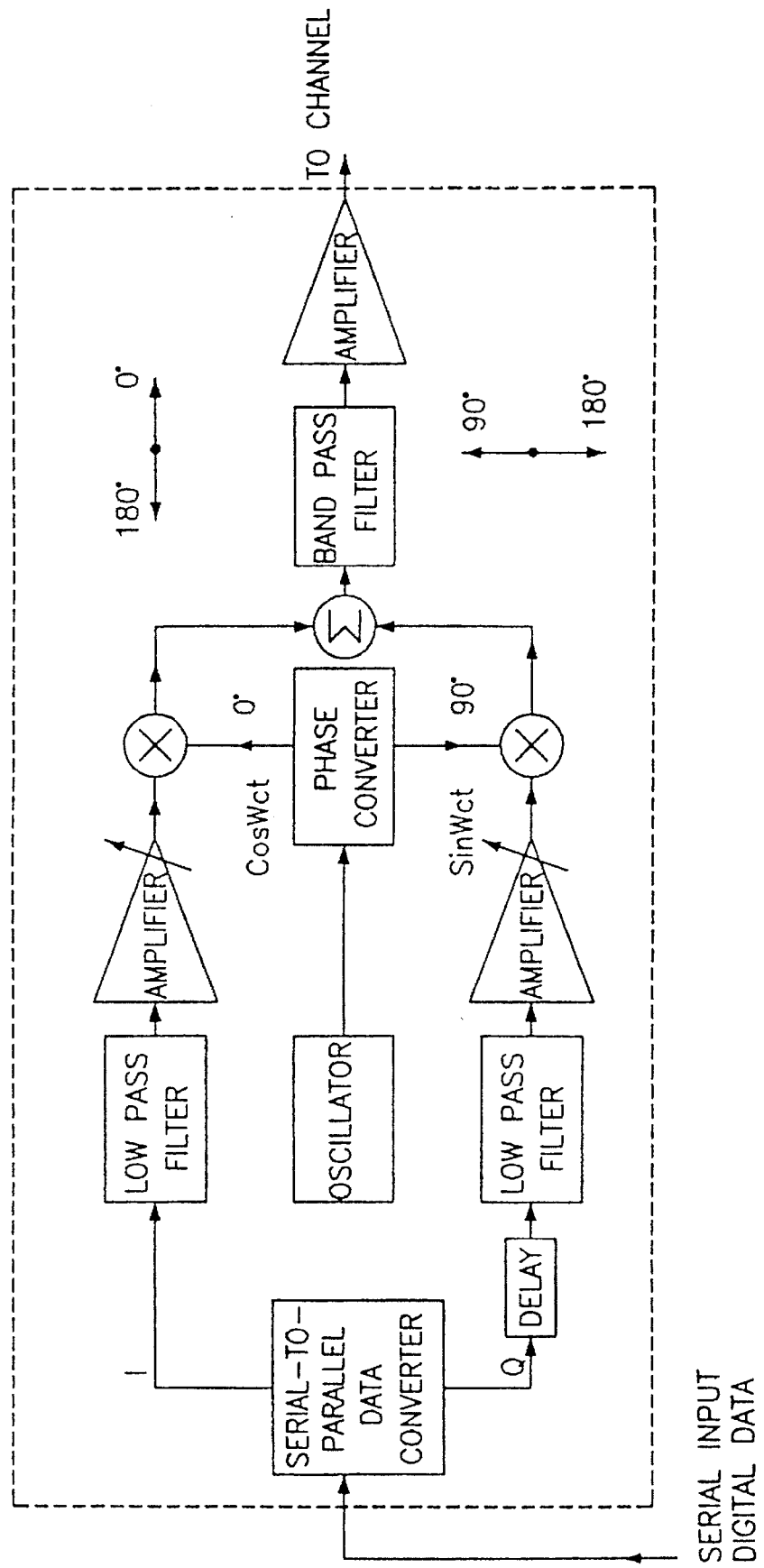
FIG. 2 is a view showing a conventional quadrature phase modulator.
Figure 3:
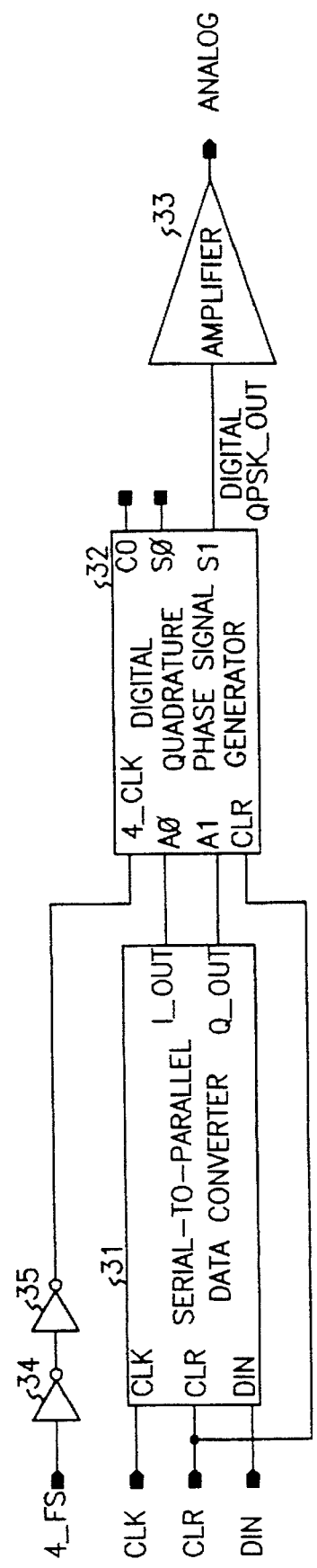
FIG. 3 is a view showing the configuration of a quadrature phase modulator according to the present invention.
Figure 4:
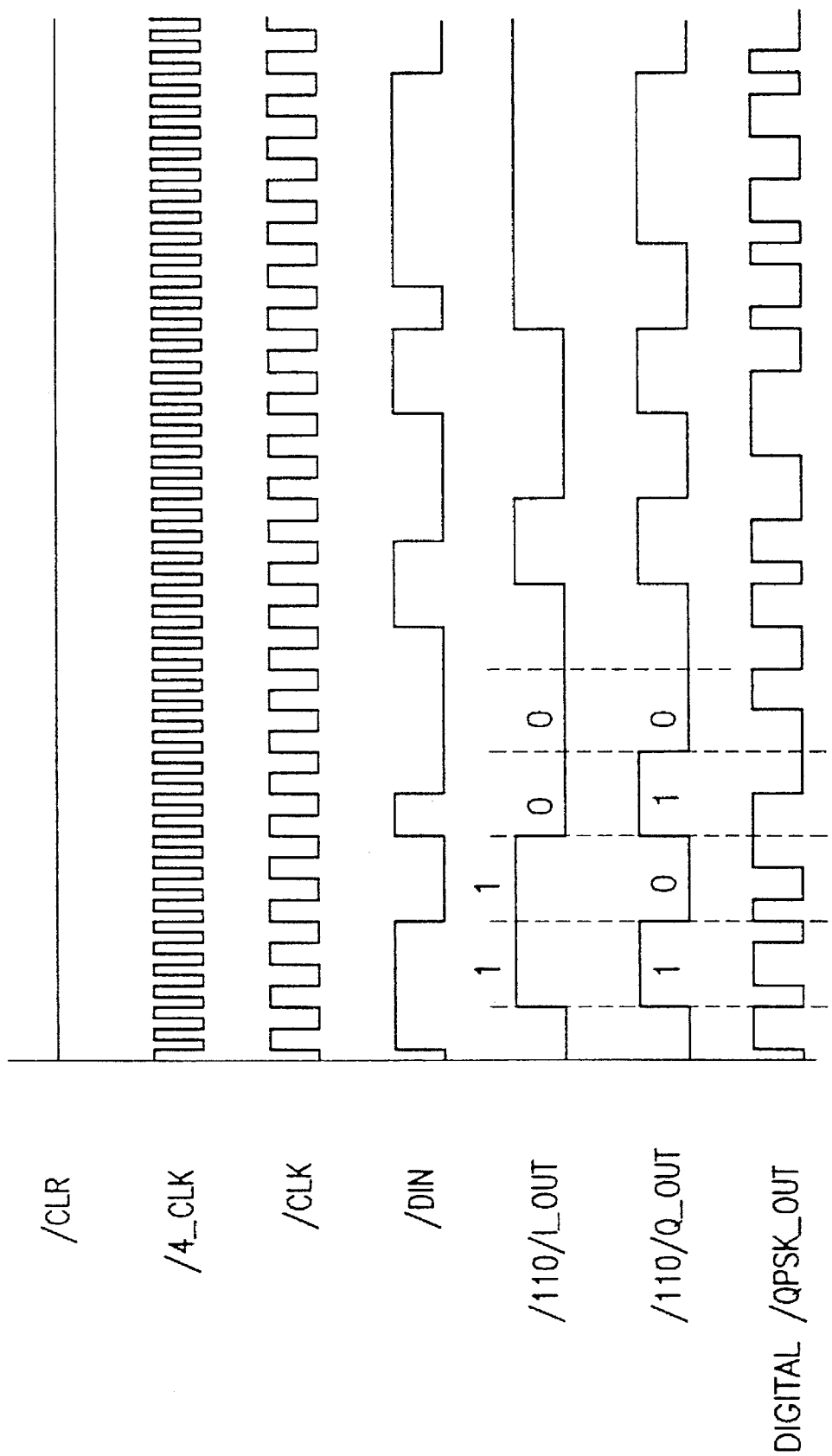
FIG. 4 is a timing chart showing the operation of a quadrature phase modulator according to the present invention.

FIG. 3 is a view showing the configuration of a quadrature phase modulator according to the present invention. In FIG. 3, reference numerals 31, 32 and 33 denote a serial-to-parallel data converter, a digital quadrature phase signal generator and amplifier, respectively, and reference numerals 34 and 35 denote inverters. The serial-to-parallel data converter 31 converts one serial input data (DIN) inputted with the velocity of clock (CLK) into two parallel data. At this time, the outputs of the serial-to-parallel data converter 31 is reduced by half of the clock velocity. The digital quadrature phase signal generator 32 generates digital signals having four different kinds of phase during the data input clock of one period according to two parallel data I_OUT and Q_OUT input from the serial-to-parallel data converter 31 as shown in FIG. 4 showing the operation of a quadrature phase modulator according to the present invention. The amplifier 33 amplifies the output signals from the digital quadrature phase signal generator 32 and forms quadrature phase modulation signals in the form of a sine wave. A 4_FS signal, whose speed is four times as quick as that of the clock signal (CLK), is delayed by the inverters 34 and 35, and synchronizes I_OUT with Q_OUT. The amplifier 33 amplifies the output signals from the digital quadrature phase signal generator 32 and generates quadrature phase modulation signals.

In FIG. 4, when I_OUT and Q_OUT are a logic values "1", the signal QPSK_OUT has digital values similar to the sine wave A (shown in FIG. 1).

Figure 5:
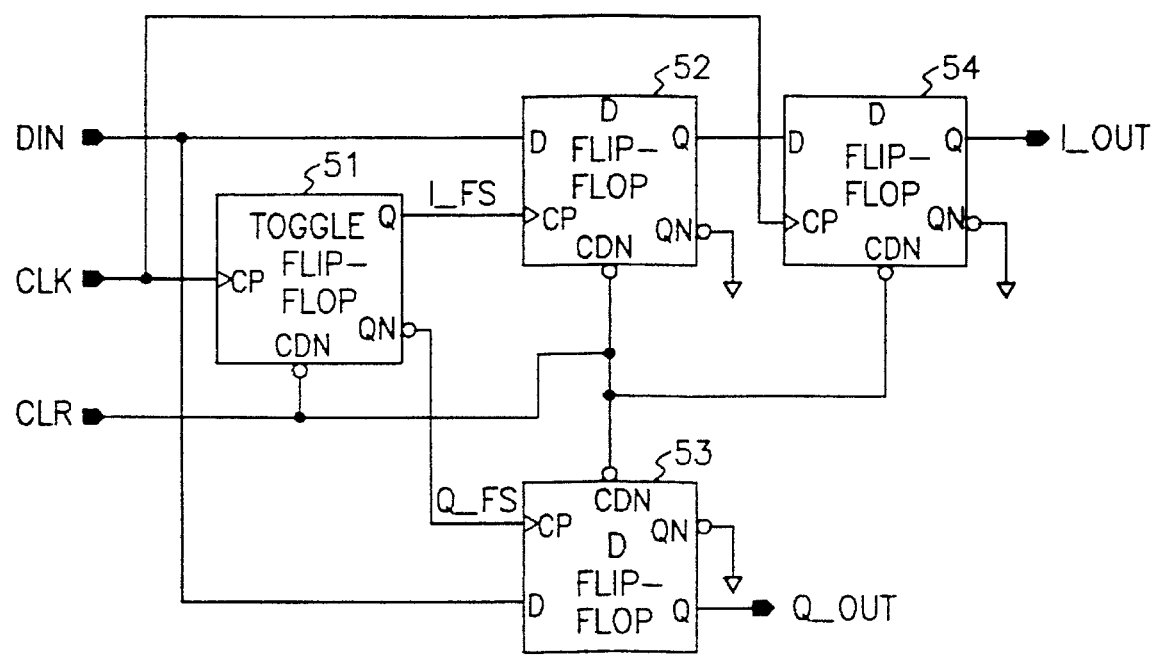
FIG. 5 is a view showing the configuration of the serial-to-parallel data converter in FIG. 3 according to the present invention.
Figure 6:
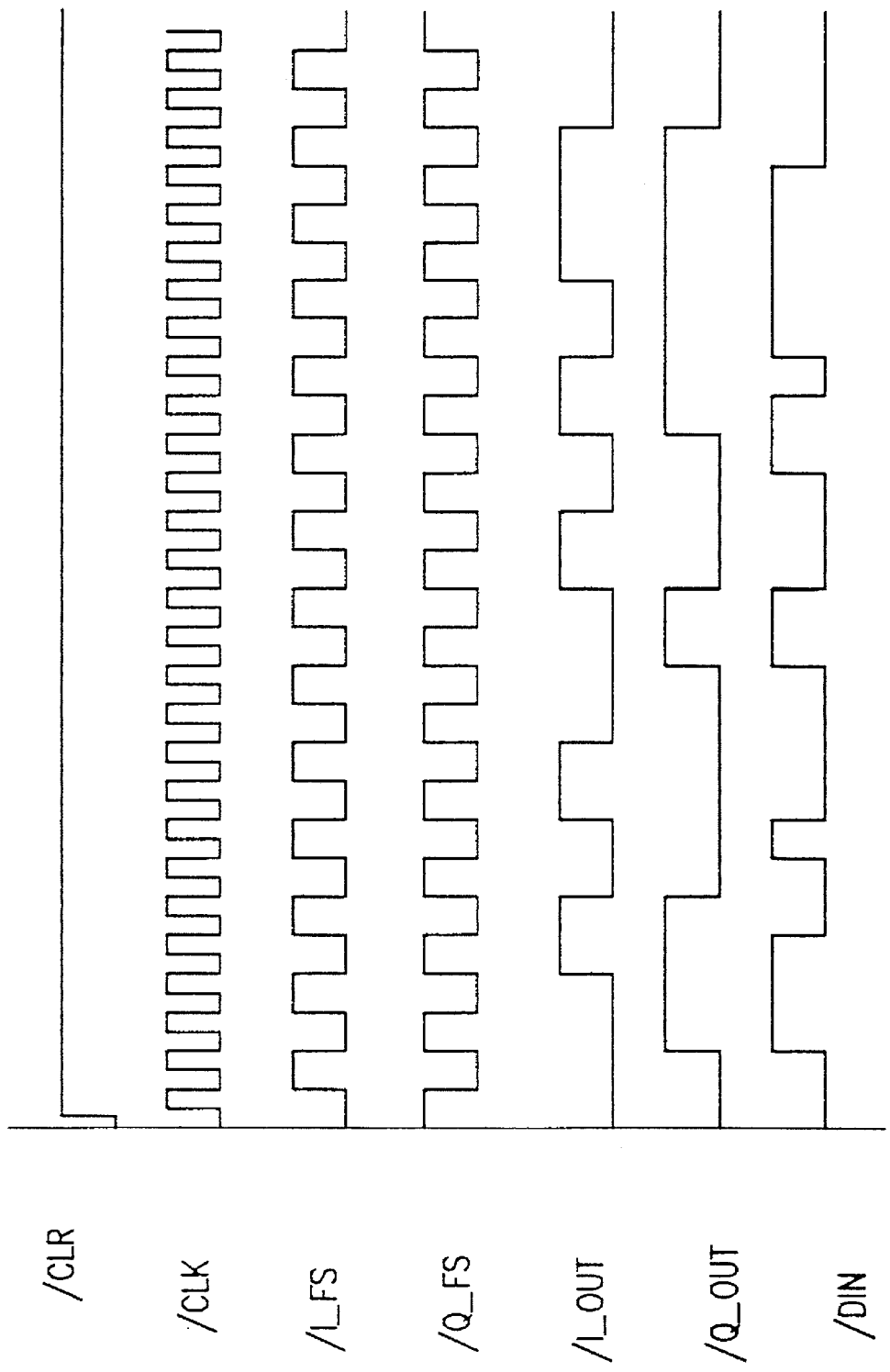
FIG. 6 is a timing chart showing the operation of the serial-to-parallel data converter in FIG. 3 according to the present invention.

FIG. 5 is a view showing the configuration of the serial-to-parallel data converter in FIG. 3. As shown in FIG. 5, the input data (DIN) inputted with the velocity of clock is latched by a D flip-flop 52. Also, the input data (DIN) inputted with the velocity of clock is latched by a D flip-flop 53. The clock signals to drive the D flip-flops 52 and 53 are generated by a toggle flip-flop 51 which divides the external clock into two, that is, the clock signal to drive the D flip-flops 52 is generated by the noninverting clock (I_FS) of the toggle flip-flop 51, and the clock signal to drive the D flip-flop 53 is generated by the inversion clock (Q_FS) of the toggle flip-flop 51. A D flip-flop 54 receiving the output of the D flip-flop 52 is used to synchronize the output I_OUT with the output Q_OUT. Also, the clear terminals of all flip-flops receive the same clear signal. FIG. 6 is a timing chart showing the operation of the serial-to-parallel data converter in FIG. 3.

Figure 7:
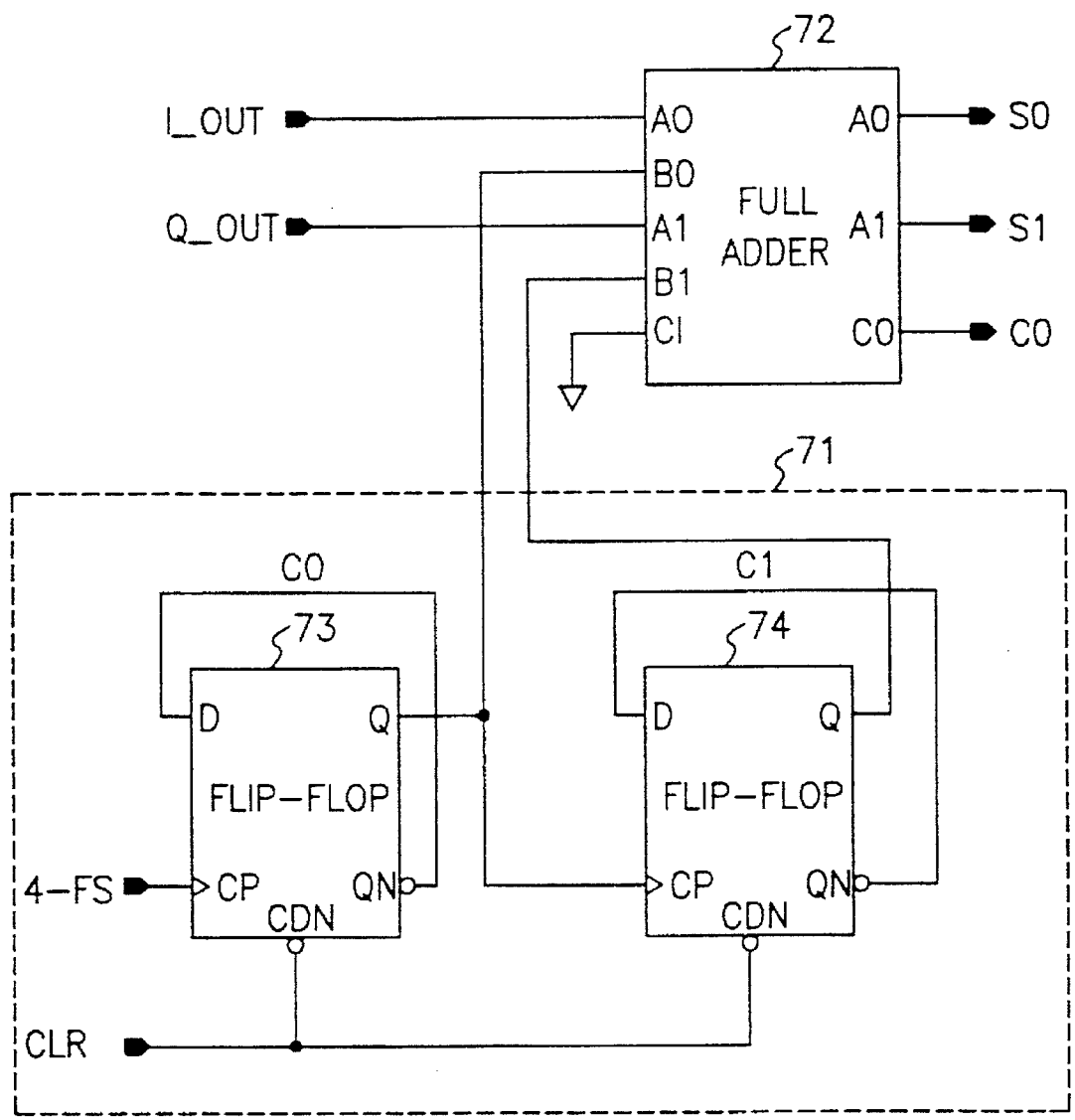
FIG. 7 is a view showing the digital quadrature signal generator in FIG. 3 according to the present invention.

FIG. 7 is a view showing the digital quadrature signal generator in FIG. 3 according to the present invention. As shown in FIG. 7, the digital quadrature signal generator consists of a 2-bit counter 71 and a full adder 72. Also, the 2-bit counter 71 consists of two D flip-flops 73 and 74 receiving the 4_FS signal and the external clear signal. The D flip-flop 73 receiving the 4_FS signal from the clock terminal outputs the values of "0, 1, 2 and 3"into the full adder 72. The clock terminal of the D flip-flop 74 receives values from D flip-flop 73 and outputs the counted values into the full adder 72. The full adder 72 adds up I_OUT, Q_OUT and the output values from the D flip-flops 73 and 74.

Although the counter 71 shown in FIG. 7 consists of two flip-flops, A 8-phase phase or 16-phase phase modulator can be obtained by adding a flip-flop to the counter 71.

Figure 8:
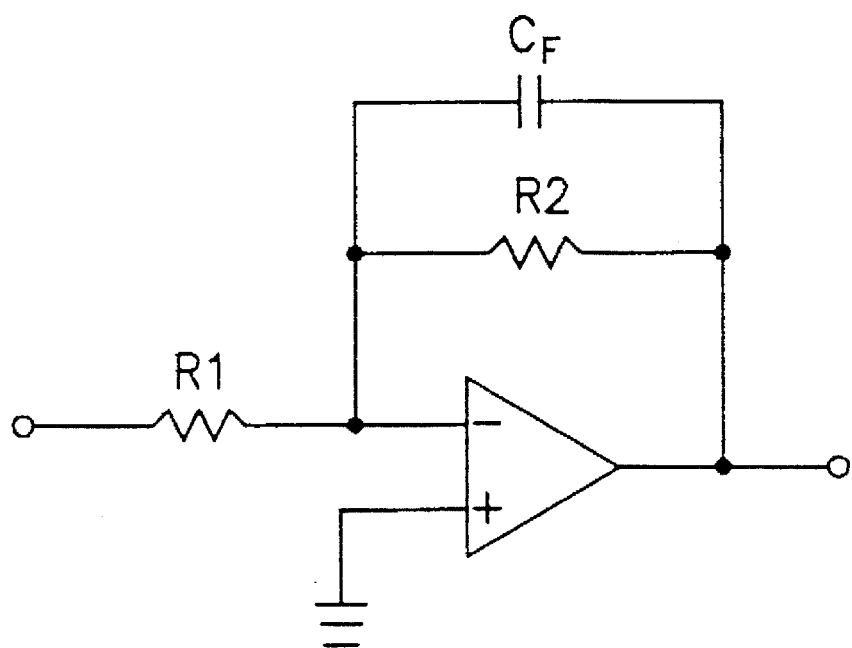
FIG. 8 is a view showing the operational amplifier in FIG. 3 according to the present invention.

FIG. 8 is a view showing the operational amplifier in FIG. 3 according to the present invention. The operational amplifier forms four types of sine wave, amplifying only the most significant bit (MSB) (S1) of the 2-bit outputs from the full adder 72.

As apparent from the above description, since the quadrature phase modulators according to the present invention has effects on the improvement of the operation speed and the simplicity of the construction, being composed of a full adder and a 2-bit counter.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. A phase modulator for transmitting data by two bits, comprising:
    a serial-to-parallel data converting means for converting serial input data into two parallel data which are reduced by half of the clock velocity; and
    a digital phase signal generating means for generating digital signals having phase difference, using a counter and an adder, wherein said digital signals have digital values similar to sine waves having a phase difference.

2. A phase modulator in accordance with claim 1, wherein said phase modulator further comprises an amplifier which amplifies the digital signal and converts the digital signal into sine waves.

3. A phase modulator in accordance with claim 2, wherein said amplifier is an operational amplifier.

4. A phase modulator in accordance with claim 1, wherein said digital phase signal generating means is synchronized with a clock signal whose speed is four times as quick as that of the clock signal inputted into said serial-to-parallel data converting means.

5. A phase modulator in accordance with claim 4, wherein the clock signal inputted into said digital phase signal generating means is delayed by inverters.

6. A phase modulator in accordance with claim 1, wherein said serial-to-parallel data converting means comprises:
    a frequency dividing means for dividing an input clock;
    a first latch means for latching the input data according to the noninverting output of the said frequency dividing means;
    a second latch means for latching the input data according to the inverting output of the said frequency dividing means and outputting a first parallel data; and
    a delay means for delaying the output of said first latch means and outputting a second parallel data.

7. A phase modulator in accordance with claim 1, wherein said digital phase signal generating means comprises:
    a counting means for being driven by a clock signal whose speed is four times as quick as that of the clock signal inputted into said serial-to-parallel data,
    a adding means for receiving the outputs of said counting means and the two parallel data, and adding up all the inputted data.

8. A phase modulator in accordance with claim 7, wherein said counting means is a 2-bit counter.

9. A phase modulator in accordance with claim 8, wherein said 2-bit counters consists of two D flip-flops.

* * * * *

UNITED STATES PATENT AND TRADEMARK OFFICE
CERTIFICATE OF CORRECTION

PATENT NO. : 5,652,552
DATED : July 29, 1997
INVENTOR(S) : Chung

It is certified that error appears in the above-identified patent and that said Letters Patent is hereby corrected as shown below:

In column 1 at line 34, please delete " FIG. 1 " and insert -- FIGS. 1a - 1d --.

In column 1 at lines 44-45, please delete " an oscillator, amplifiers, multipliers, an adder, a band pass filter --.

In column 2 at line 13, please insert the paragraph -- Figs. 1a-1d show waveforms produced by the circuit of figure 1.

Signed and Sealed this

Twenty-sixth Day of May, 1998

*Attest:*

BRUCE LEHMAN

*Attesting Officer*     *Commissioner of Patents and Trademarks*